(12) United States Patent
Huang (10) Patent No.: US 12,338,808 B2
(45) Date of Patent: Jun. 24, 2025

(54) IN-VEHICLE INFLATOR

(71) Applicant: Tao Huang, Ningbo (CN)

(72) Inventor: Tao Huang, Ningbo (CN)

( * ) Notice: Subject to any disclaimer, the term of this patent is extended or adjusted under 35 U.S.C. 154(b) by 235 days.

(21) Appl. No.: 18/361,000

(22) Filed: Jul. 28, 2023

(65) Prior Publication Data

US 2024/0125318 A1  Apr. 18, 2024

(30) Foreign Application Priority Data

Oct. 18, 2022  (CN) .......................... 202211272277.0

(51) Int. Cl.
| | |
|---|---|
| *F04B 39/12* | (2006.01) |
| *B60C 23/10* | (2006.01) |
| *F04B 35/04* | (2006.01) |
| *F04B 35/06* | (2006.01) |
| *F04B 53/00* | (2006.01) |
| *F04B 53/16* | (2006.01) |

(52) U.S. Cl.
CPC ............ *F04B 39/121* (2013.01); *B60C 23/10* (2013.01); *F04B 35/04* (2013.01); *F04B 35/06* (2013.01); *F04B 39/12* (2013.01); *F04B 53/16* (2013.01); *F04B 53/003* (2013.01)

(58) Field of Classification Search
CPC ........ F04B 39/121; F04B 35/04; F04B 35/06; F04B 39/12; F04B 53/16; B60C 23/10
See application file for complete search history.

(56) References Cited

U.S. PATENT DOCUMENTS

| | | | | |
|---|---|---|---|---|
| 5,127,808 A | * | 7/1992 | Nichols | B62J 11/02 417/234 |
| 5,195,427 A | | 3/1993 | Germano | |
| 6,095,762 A | * | 8/2000 | Wheeler | F04B 49/12 417/275 |
| 8,079,824 B2 | * | 12/2011 | Chou | F04B 35/06 417/16 |
| 10,837,433 B2 | * | 11/2020 | Walmsley | F04B 39/0094 |
| 2020/0300237 A1 | * | 9/2020 | Marbet | A61M 1/06 |

FOREIGN PATENT DOCUMENTS

| | | |
|---|---|---|
| CN | 111356487 A | 6/2020 |
| CN | 212130705 U | 12/2020 |
| CN | 112814871 A | 5/2021 |
| CN | 214577848 U | 11/2021 |
| CN | 215521205 U | 1/2022 |
| CN | 217518807 U | 9/2022 |
| EP | 3482782 A1 | 5/2019 |

* cited by examiner

*Primary Examiner* — Peter J Bertheaud
(74) *Attorney, Agent, or Firm* — Getech Law LLC; Jun Ye (57) ABSTRACT

The present invention provides an in-vehicle inflator, comprising an internal housing provided with a mounting space, the internal housing comprising a battery compartment, and an inflation device provided within the mounting space and attached to an inner wall of the internal housing, the inflation device comprising a motor assembly and a piston chamber, where the motor assembly is connected to the piston chamber in a transmission manner, the piston chamber is eccentrically offset from the motor assembly, and the motor assembly and the piston chamber together define a recess for objects, wherein the battery compartment is provided in the recess for objects, and the battery compartment is attached to the motor assembly. The problem addressed by the present invention is how to make the inflator more portable.

8 Claims, 5 Drawing Sheets

IN-VEHICLE INFLATOR

TECHNICAL FIELD

The present invention relates to the technical field of inflators, and in particular to an in-vehicle inflator.

BACKGROUND

With the development of inflators, the pursuit of high performance and high inflation efficiency in various types of inflators often leads to the neglect of the portability aspect that inflators require. Specifically, for an in-vehicle inflator, its portability often determines the practicality of its use by users. The volume of in-vehicle inflators in related art does not meet the portability requirements. It usually requires the inflator to be placed in locations such as the trunk. Moreover, once the in-vehicle inflator occupies a large volume, it can affect the placement of other items in the vehicle, resulting in a poor user experience.

Therefore, it is imperative to address the issue of improving the portability of inflators, making them easier to carry.

SUMMARY

The problem addressed by the present invention is how to make the inflator more portable.

To solve the above problems, the present invention provides an in-vehicle inflator, comprising an internal housing provided with a mounting space, the internal housing comprising a battery compartment, and an inflation device provided within the mounting space and attached to an inner wall of the internal housing, the inflation device comprising a motor assembly and a piston chamber, where the motor assembly is connected to the piston chamber in a transmission manner, the piston chamber is eccentrically offset from the motor assembly, and the motor assembly and the piston chamber together define a recess for objects, wherein the battery compartment is provided in the recess for objects, and the battery compartment is attached to the motor assembly.

Compared with the prior art, the solution can achieve the following effects: The battery compartment, in conjunction with other components of the internal housing enables the internal housing to securely limit the inflation device, further reducing the overall volume of the in-vehicle inflator. As a result, the in-vehicle inflator in the technical solution becomes more portable. Meanwhile, the arrangement of the recess for objects enables the battery compartment to form an integrated unit with the first housing and the second housing, making full use of the space. This not only reduces the volume of the in-vehicle inflator but also improves the compatibility between the battery compartment and the first housing and the second housing.

In one technical solution of the present invention, the internal housing further comprises a first housing provided opposite to the battery compartment, the first housing being connected to the battery compartment and being attached to the motor assembly and the piston chamber, and a second housing, with one end of the second housing connected to the battery compartment and the other end of the second housing connected to the first housing, the second housing being provided opposite to the first housing and being attached to the piston chamber.

Compared with the prior art, the solution can achieve the following effects: The battery compartment and the second housing are provided separately. The battery compartment needs to be assembled with the second housing before it can be connected to the first housing. Since the battery compartment and the second housing are not provided as a single unit, it is convenient to disassemble the battery compartment.

In one technical solution of the present invention, the in-vehicle inflator further comprises a damping assembly connected to the internal housing and provided in the mounting space, the damping assembly being attached to the inflation device.

Compared with the prior art, the solution can achieve the following effects: The arrangement of the damping assembly can reduce the vibration transmitted to the internal housing during the operation of the inflation device. Therefore, even when the in-vehicle inflator in the technical solution operates at a high power, the in-vehicle inflator is still able to provide users with a less vibrating experience.

In one technical solution of the present invention, gasket pieces are provided between the damping assembly and the inflation device.

Compared with the prior art, the solution can achieve the following effects: The vibration is further dampened.

In one technical solution of the present invention, the damping assembly further comprises a first damping piece connected to the battery compartment, the first damping piece being attached to the motor assembly, a second damping piece provided opposite to the first damping piece and provided in the first housing, the second damping piece being attached to the motor assembly, a third damping piece connected to the second housing, the third damping piece being attached to the piston chamber, and a fourth damping piece connected to the first housing, the fourth damping piece being attached to the piston chamber.

Compared with the prior art, the solution can achieve the following effects: The distributed arrangement of the plurality of damping pieces can further improve the vibration-reducing effect of the in-vehicle inflator in the technical solution.

In one technical solution of the present invention, a receiving groove is formed on the third damping piece.

Compared with the prior art, the solution can achieve the following effects: The arrangement of the receiving groove allows for the extended pipeline from the piston chamber to engage with the receiving groove, providing a certain limit to the extended pipeline from the piston chamber and reducing the impact of vibrations on the pipeline during the operation of the piston chamber.

In one technical solution of the present invention, the inflation device is compressed and securely limited and engaged in the in-vehicle inflator by connecting an integrated unit formed by the battery compartment and the second housing to the first housing.

Compared with the prior art, the solution can achieve the following effects: The fixation of the inflation device within the mounting space is achieved solely through the mechanical connections between the second housing, the first housing, and the battery compartment. That is, no metal connectors such as screws or nuts are used to connect the inflation device to the internal housing. This design avoids the transmission of strong vibrations generated by the inflation device to the internal housing through metal connectors. Instead, the use of the gasket pieces, which are made of rubber, provides a better damping effect and further reduces the vibration, thus further improving the vibration-reducing effect of the in-vehicle inflator in the technical solution.

In one technical solution of the present invention, the in-vehicle inflator further comprises an external housing covering at least a portion of the internal housing, the external housing enclosing the internal housing.

Compared with the prior art, the solution can achieve the following effects: The enclosed assembly method allows for easier disassembly and assembly of the in-vehicle inflator in the technical solution.

In one technical solution of the present invention, the in-vehicle inflator further comprises a mounting plate connected to an outer wall of the internal housing and provided around a peripheral edge of the outer wall of the internal housing, and an illumination piece connected to the mounting plate and oriented towards one side of the piston chamber.

Compared with the prior art, the solution can achieve the following effects: The surrounding arrangement of the illumination piece causes the emitted light to disperse in a circular pattern, reducing dark spots in the illumination when using the in-vehicle inflator and enhancing the practicality of the in-vehicle inflator.

In one technical solution of the present invention, the external housing covers the mounting plate, and the external housing is offset from the mounting plate; the external housing and the mounting plate define a placement space; the illumination piece is provided within the placement space.

Compared with the prior art, the solution can achieve the following effects: The placement space is created through the interference fit and offset arrangement between the external housing and the mounting plate, which allows the dazzling light circle closest to the light source of the illumination piece to be blocked by the external housing. As a result, the extended and soft light emitted by the illumination components can disperse in all directions through the transparent cover, providing users with a better lighting experience.

1 represents an in-vehicle inflator; 100 represents an internal housing; 110 represents a battery compartment; 120 represents a first housing; 130 represents a second housing; 200 represents an inflation device; 210 represents a motor assembly; 220 represents a piston chamber; 230 represents a recess for objects; 300 represents a damping assembly; 310 represents a first damping piece; 320 represents a second damping piece; 330 represents a third damping piece; 331 represents a receiving groove; 340 represents a fourth damping piece; 350 represents a gasket piece; 400 represents an external housing; 500 represents a mounting plate; X1 represents first distance; 600 represents an illumination piece; 700 represents a placement space; 800 represents an end plate; 900 represents a top cover; 910 represents a transparent cover; and 920 represents a handle piece.

DETAILED DESCRIPTION

In order to make the aforementioned purposes, features, and advantages of the present invention more comprehensible, specific embodiments of the present invention are described in detail.

Embodiment 1

Figure 1:
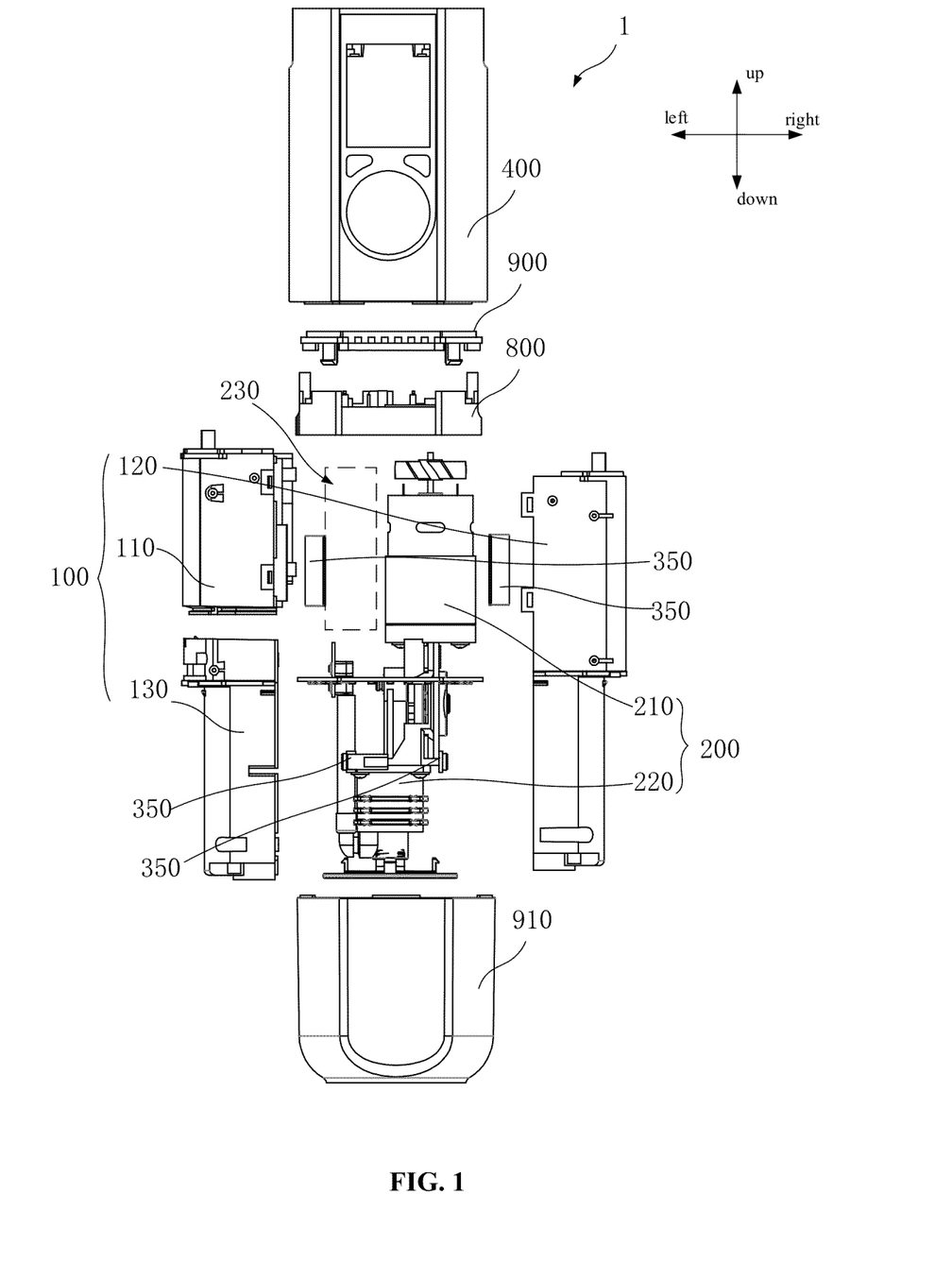
FIG. 1 is a schematic diagram of the structure of the in-vehicle inflator.

Referring to FIG. 1, the embodiment provides an in-vehicle inflator 1, which comprises an internal housing 100 provided with a mounting space, the internal housing 100 comprising a battery compartment 110, and an inflation device 200 provided within the mounting space and attached to the inner wall of the internal housing 100, the inflation device 200 comprising a motor assembly 210 and a piston chamber 220, where the motor assembly 210 is connected to the piston chamber 220 in a transmission manner, the piston chamber 220 is eccentrically offset from the motor assembly 210, and the motor assembly 210 and the piston chamber 220 together define a recess for objects 230, wherein the battery compartment 110 is provided in the recess for objects 230, and the battery compartment 110 is attached to the motor assembly 210.

Figure 2:
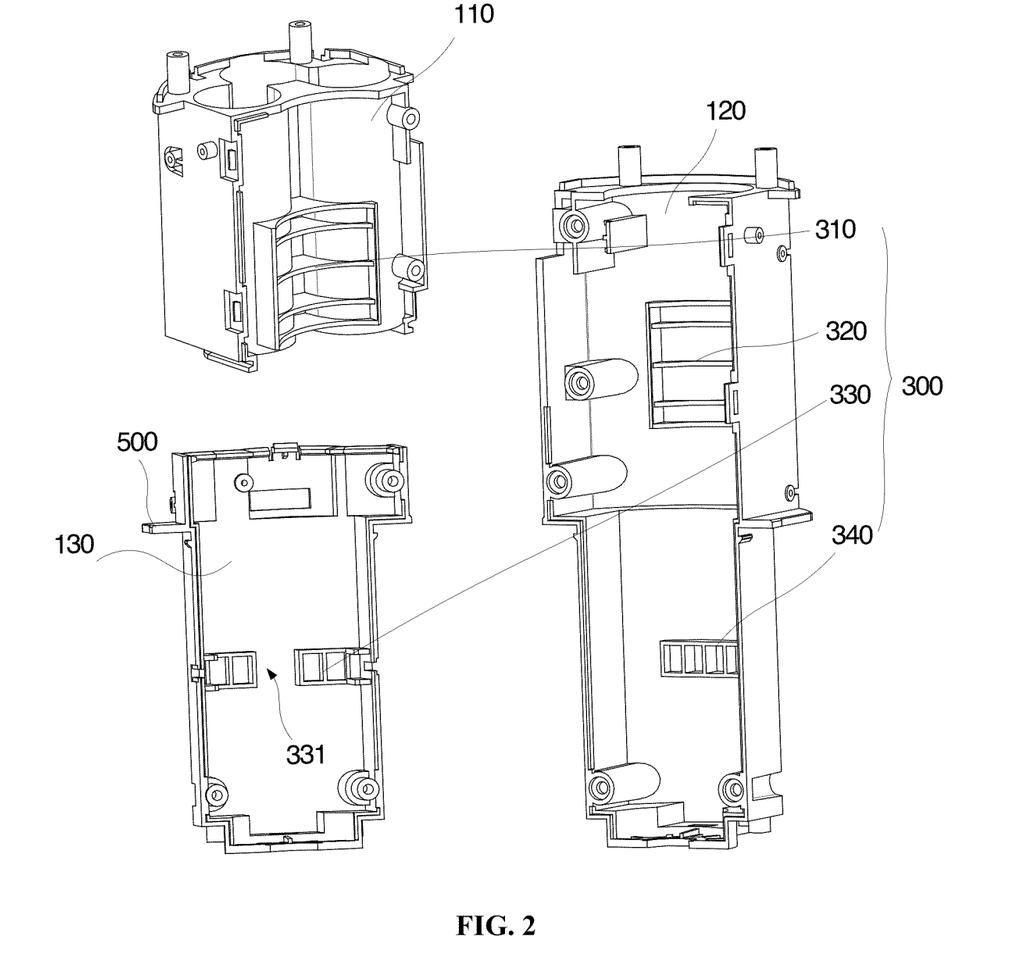
FIG. 2 is a schematic diagram of the structure of the internal housing.

In the embodiment, the inflation device 200 is provided within the mounting space defined by the internal housing 100, and the inflation device 200 is attached to the inner wall of the internal housing 100 to minimize the volume of the in-vehicle inflator 1. Furthermore, in the embodiment, the battery compartment 110 is a part of the internal housing 100, and the battery compartment 110 is not separately provided. Meanwhile, the battery compartment 110 in the embodiment is constructed as an independent housing, as shown in FIG. 2. The battery compartment 110 is an injection-molded piece made of a rigid material. The battery compartment 110 is internally divided into separate compartments for housing the batteries. Compared to the approach of covering the batteries with a rubber coating in the related art, the arrangement of the battery compartment 110 in the embodiment provides better protection for the batteries, enhancing the safety performance of the in-vehicle inflator 1. Additionally, the battery compartment 110, in conjunction with other components of the internal housing 100 enables the internal housing 100 to securely limit the inflation device 200, further reducing the overall volume of the in-vehicle inflator 1. As a result, the in-vehicle inflator 1 in the embodiment becomes more portable.

Furthermore, the in-vehicle inflator 1 in the embodiment preferably has dimensions of 14 cm in length, 10 cm in width, and 23 cm in height, with a tolerance of plus or minus 1 cm.

Meanwhile, the heat generated by the battery can directly transfer to the battery compartment 110, and the larger contact surface of the battery compartment 110 allows for efficient heat dissipation. Therefore, the separately provided battery compartment 110 provides better heat dissipation performance.

The internal housing 100 further comprises a first housing 120 provided opposite to the battery compartment 110, the first housing 120 being connected to the battery compartment 110 and being attached to the motor assembly 210 and the piston chamber 220, and a second housing 130, with one end of the second housing 130 connected to the battery compartment 110 and the other end of the second housing 130 connected to the first housing 120, the second housing 130 being provided opposite to the first housing 120 and being attached to the piston chamber 220.

Furthermore, referring to FIG. 1, the recess for objects 230 corresponds to the dashed line section in FIG. 1. The first axis is defined as the vertical direction at the position of the motor assembly 210, and the second axis is defined as the vertical direction at the position of the piston chamber 220; the first axis and the second axis are offset from each other, indicating that the piston chamber 220 is eccentrically provided relative to the motor assembly 210. In the embodiment, the piston chamber 220 is offset from the motor assembly 210 by a larger distance. Preferably, the second axis is offset from the first axis by 2 to 2.5 cm, thereby ensuring sufficient space for the recess for objects 230 to facilitate the placement and assembly of the battery compartment 110. Meanwhile, the arrangement of the recess for objects 230 enables the battery compartment 110 to form an integrated unit with the first housing 120 and the second housing 130, making full use of the space. This not only reduces the volume of the in-vehicle inflator 1 but also improves the compatibility between the battery compartment 110 and the first housing 120 and the second housing 130.

The battery compartment 110 and the second housing 130 are provided separately. The battery compartment 110 needs to be assembled with the second housing 130 before it can be connected to the first housing 120. Since the battery compartment 110 and the second housing 130 are not provided as a single unit, it is convenient to disassemble the battery compartment 110.

Figure 3:
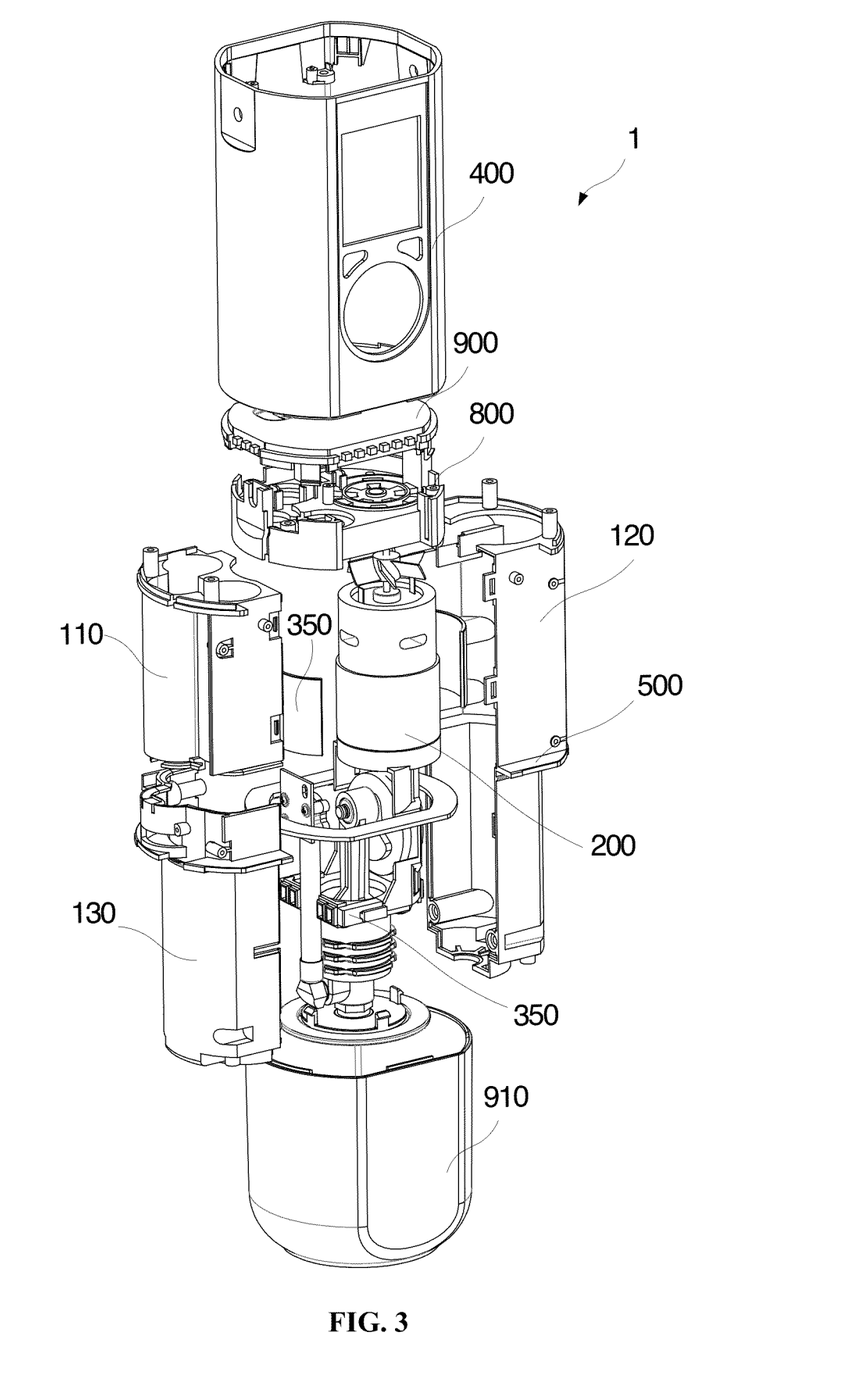
FIG. 3 is a schematic diagram of another structure of the in-vehicle inflator.

Referring to FIGS. 2 and 3, in the embodiment, the in-vehicle inflator 1 further comprises a damping assembly 300 connected to the internal housing 100 and provided in the mounting space, the damping assembly 300 being attached to the inflation device 200.

The arrangement of the damping assembly 300 can reduce the vibration transmitted to the internal housing 100 during the operation of the inflation device 200. Therefore, even when the in-vehicle inflator 1 in the embodiment operates at a high power, the in-vehicle inflator 1 is still able to provide users with a less vibrating experience.

Furthermore, gasket pieces 350 are provided between the damping assembly 300 and the inflation device 200. The gasket piece 350 is made of rubber, which further dampens the vibration.

The damping assembly 300 further comprises a first damping piece 310 connected to the battery compartment 110, the first damping piece 310 being attached to the motor assembly 210, a second damping piece 320 provided opposite to the first damping piece 310 and provided in the first housing 120, the second damping piece 320 being attached to the motor assembly 210, a third damping piece 330 connected to the second housing 130, the third damping piece 330 being attached to the piston chamber 220, and a fourth damping piece 340 connected to the first housing 120, the fourth damping piece 340 being attached to the piston chamber 220.

Specifically, the damping assembly 300 comprises a plurality of damping pieces. In the embodiment, the in-vehicle inflator 1 has high damping requirements. As a result, a high-speed motor is used to improve the inflation efficiency of the inflation device 200, which leads to intensified vibrations. To address it, a first damping piece 310 is connected to the battery compartment 110, and correspondingly, a second damping piece 320 is provided opposite to the first damping piece 310. The second damping piece 320 is provided in the first housing 120. By sandwiching the motor assembly 210 between the first damping piece 310 and the second damping piece 320, vibration is further dampened.

Furthermore, a fourth damping piece 340 is provided on the first housing 120 at a position corresponding to the piston chamber 220 in a connected manner. The fourth damping piece 340 is provided opposite to the third damping piece 330, and the third damping piece 330 is connected to the inner wall of the second housing 130. Due to the different structures of the piston chamber 220, the vibration amplitude generated by the piston chamber 220 differs from that of the motor assembly 210. Therefore, as shown in FIG. 3, the gasket piece 350 provided corresponding to the third damping piece 330 in the second housing 130 differs in structure from the gasket pieces 350 corresponding to the first damping piece 310 and the second damping piece 320. The gasket pieces 350 provided for the first damping piece 310 and the second damping piece 320 are arc-shaped, while the gasket piece 350 corresponding to the third damping piece 330 is a folded rubber pad that covers the outer housing of the piston chamber 220. This arrangement achieves a better damping effect.

Referring to FIG. 2, a receiving groove 331 is formed on the third damping piece 330. The arrangement of the receiving groove 331 allows for the extended pipeline from the piston chamber 220 to engage with the receiving groove 331, providing a certain limit to the extended pipeline from the piston chamber 220 and reducing the impact of vibrations on the pipeline during the operation of the piston chamber 220. Meanwhile, the arrangement of the receiving groove 331 eliminates the need for the second housing 130 to form a separate groove to accommodate the extended pipeline from the third damping piece 330. This improves the space utilization of the inner wall of the second housing 130 and enhances the compatibility during the assembly of the inflation device 200 and the internal housing 100.

Referring to FIGS. 1 to 3, in the embodiment, the inflation device 200 is compressed and securely limited and engaged in the in-vehicle inflator 1 by connecting the integrated unit formed by the battery compartment 110 and the second housing 130 to the first housing 120.

Specifically, the fixation of the inflation device 200 within the mounting space is achieved solely through the mechanical connections between the second housing 130, the first housing 120, and the battery compartment 110. That is, no metal connectors such as screws or nuts are used to connect the inflation device 200 to the internal housing 100. This design avoids the transmission of strong vibrations generated by the inflation device 200 to the internal housing 100 through metal connectors. Instead, the use of the gasket pieces 350, which are made of rubber, provides a better damping effect and further reduces the vibration, thus further improving the vibration-reducing effect of the in-vehicle inflator 1 in the embodiment.

Figure 4:
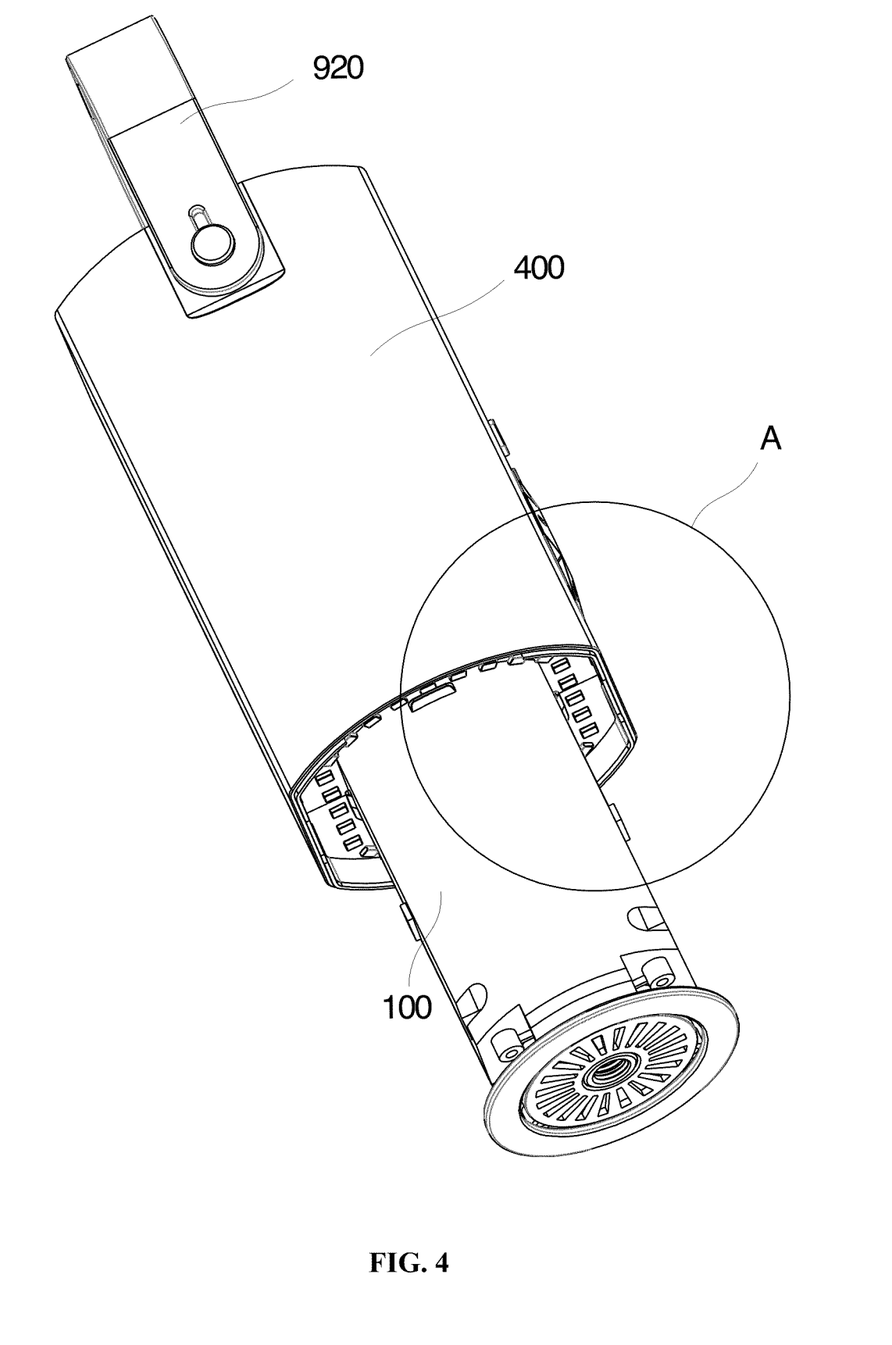
FIG. 4 is a schematic diagram of the structure of the in-vehicle inflator without the transparent cover.
Figure 5:
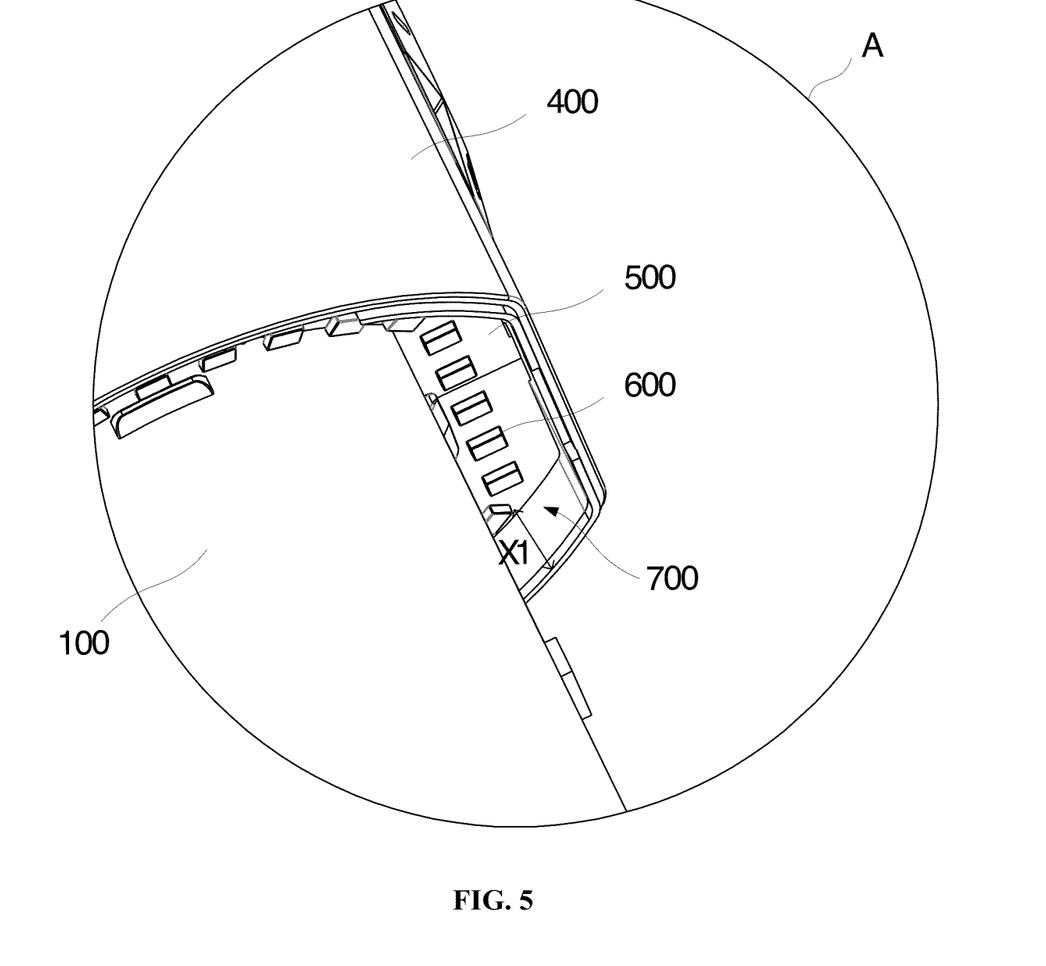
FIG. 5 is a partial enlarged view of section A in FIG. 4.
Reference Numerals in the Figures are as Follows.

Referring to FIGS. 1 to 3, the in-vehicle inflator 1 further comprises an external housing 400 covering at least a portion of the internal housing 100, the external housing 400 enclosing the internal housing 100. Referring to FIGS. 1, 4, and 5, the in-vehicle inflator 1 further comprises a mounting plate 500 connected to the outer wall of the internal housing 100 and provided around the peripheral edge of the outer wall of the internal housing 100, and an illumination piece 600 connected to the mounting plate 500 and oriented towards one side of the piston chamber 220. It should be noted that in FIG. 1, the downward direction refers to the side facing the piston chamber 220, while the upward direction refers to the side facing the motor assembly 210. The mounting plate 500 is provided around the peripheral edge of the outer wall of the internal housing 100, and correspondingly, the illumination piece 600 is also provided in a circular manner to fit the mounting plate 500.

Specifically, during the assembly of the in-vehicle inflator 1 in the embodiment, the battery compartment 110 is assembled with the second housing 130. Then, the first housing 120 is connected to the battery compartment 110 and the second housing 130 to form the internal housing 100. Next, the end plate 800 is assembled to the end of the internal housing 100, and such end is the end where the motor assembly 210 is positioned. The external housing 400 can then enclose the outer wall of the internal housing 100. Finally, the top cover 900 is connected to the end plate 800 to complete the assembly of the overall structure of the in-vehicle inflator 1. The enclosed assembly method allows for easier disassembly and assembly of the in-vehicle inflator 1 in the embodiment.

Furthermore, after the assembly of the illumination piece 600 onto the mounting plate 500, the assembly of the in-vehicle inflator 1 can be completed by simply covering the transparent cover 910 over the outer wall of the second housing 130 and the portion of the first housing 120 located at the piston chamber 220. This assembly process is convenient and fast.

Referring to FIGS. 4 and 5, in the embodiment, the external housing 400 covers the mounting plate 500, and the external housing 400 is offset from the mounting plate 500; the external housing 400 and the mounting plate 500 define a placement space 700; the illumination piece 600 is provided within the placement space 700.

Specifically, the illumination piece 600 is an LED strip. Meanwhile, the mounting plate 500 is recessed relative to the external housing 400, and the placement space 700 acts as a buffer zone. The illumination piece 600 is located within the placement space 700. When the in-vehicle inflator 1 is in normal use, the illumination piece 600 emits light. The positions close to the illumination piece 600 and the mounting plate 500 create a concentrated display of light, and the illumination piece 600 forms a ring of concentrated brightness near the mounting plate 500. As the light from the illumination piece 600 extends further away, the light becomes softer. Only the positions near the light source exhibit concentrated light, resulting in a relatively bright and dazzling effect. In the embodiment, the placement space 700 is created through the interference fit and offset arrangement between the external housing 400 and the mounting plate 500, which allows the dazzling light circle closest to the light source of the illumination piece 600 to be blocked by the external housing 400. As a result, the extended and soft light emitted by the illumination piece 600 can disperse in all directions through the transparent cover 910, providing users with a better lighting experience. Meanwhile, the protrusion distance of the external housing 400 relative to the mounting plate 500 is preferably defined as the first distance X1. In order to block the dazzling light circle while minimizing interference with the brightness of the illumination piece 600, the first distance X1 is preferably 0.7 to 1 cm.

Embodiment 2

Referring to FIG. 4, in the embodiment, the in-vehicle inflator 1 further comprises a handle piece 920. The handle piece 920 is rotatably connected to the external housing 400, and the handle piece 920 can be used for carrying the inflator, facilitating the mobility of the inflator. Alternatively, the in-vehicle inflator 1 can be hung at a higher position outdoors through the handle piece 920, providing illumination. Meanwhile, the handle piece 920 is rotatable, allowing for easy storage of the handle piece 920 and reducing the storage volume of the in-vehicle inflator 1.

Preferably, the handle piece 920 is made of flexible rubber material, and a flexible handle piece 920 provides a comfortable grip for carrying. The two ends of the handle piece 920 are hinged to the other end of the housing using shaft pins.

Furthermore, the in-vehicle inflator 1 further comprises a diffuser piece. The diffuser piece is attached to the outer wall of the internal housing 100 near the position of the piston chamber 220, and the diffuser piece is provided between the internal housing 100 and the transparent cover 910.

Specifically, the diffuser piece is a glazing paperboard structure, and the glazing paperboard reflects the light emitted by the illumination piece 600. The reflected light can then disperse from the transparent cover 910. Meanwhile, the diffuser piece fully covers the outer wall of the internal housing 100 near the position of the piston chamber 220. By utilizing the reflective surface of the glazing paperboard, the light is evenly distributed, achieving optimal illumination and enhancing the lighting effect.

Although the present invention is disclosed above, the present invention is not limited thereto. Various changes and modifications may be made by those skilled in the art without departing from the spirit and scope of the present invention. Therefore, the protection scope stated in the claims shall prevail with regard to the protection scope of the present invention.

What is claimed:

1. An in-vehicle inflator, comprising:
    an internal housing provided with a mounting space, the internal housing comprising a battery compartment, and
    an inflation device provided within the mounting space and attached to an inner wall of the internal housing, the inflation device comprising:
    a motor assembly and a piston chamber, where the motor assembly is connected to the piston chamber in a transmission manner, the piston chamber is eccentrically offset from the motor assembly, and the motor assembly and the piston chamber together define a recess for objects,
    wherein the battery compartment is provided in the recess for objects, and the battery compartment is attached to the motor assembly;
    the internal housing further comprising:
    a first housing provided opposite to the battery compartment, the first housing being connected to the battery compartment and being attached to the motor assembly and the piston chamber, and
    a second housing, with one end of the second housing connected to the battery compartment and the other end of the second housing connected to the first housing, the second housing being provided opposite to the first housing and being attached to the piston chamber,
    wherein the inflation device is compressed and securely limited and engaged in the in-vehicle inflator by connecting an integrated unit formed by the battery compartment and the second housing to the first housing, and the fixation of the inflation device is achieved solely through the mechanical connections between the second housing, the first housing, and the battery compartment.

2. The in-vehicle inflator according to claim 1, further comprising:

a damping assembly connected to the internal housing and provided in the mounting space, the damping assembly being attached to the inflation device.

3. The in-vehicle inflator according to claim 2, wherein gasket pieces are provided between the damping assembly and the inflation device.

4. The in-vehicle inflator according to claim 2, wherein the damping assembly further comprises:
- a first damping piece connected to the battery compartment, the first damping piece being attached to the motor assembly,
- a second damping piece provided opposite to the first damping piece and provided in the first housing, the second damping piece being attached to the motor assembly,
- a third damping piece connected to the second housing, the third damping piece being attached to the piston chamber, and
- a fourth damping piece connected to the first housing, the fourth damping piece being attached to the piston chamber.

5. The in-vehicle inflator according to claim 4, wherein a receiving groove is formed on the third damping piece.

6. The in-vehicle inflator according to claim 1, further comprising:
- an external housing covering at least a portion of the internal housing, the external housing enclosing the internal housing.

7. The in-vehicle inflator according to claim 6, further comprising:
- a mounting plate connected to an outer wall of the internal housing and provided around a peripheral edge of the outer wall of the internal housing, and
- an illumination piece connected to the mounting plate and oriented towards one side of the piston chamber.

8. The in-vehicle inflator according to claim 7, wherein the external housing covers the mounting plate, and the external housing is offset from the mounting plate; the external housing and the mounting plate define a placement space;
the illumination piece is provided within the placement space.

* * * * *